(12) United States Patent
Song et al.

(10) Patent No.: US 11,514,498 B2
(45) Date of Patent: Nov. 29, 2022

(54) SYSTEM AND METHOD FOR INTELLIGENT GUIDED SHOPPING

(71) Applicants: Beijing Jingdong Shangke Information Technology Co., Ltd., Beijing (CN); JD.com American Technologies Corporation, Mountain View, CA (US)

(72) Inventors: Qi Song, Mountain View, CA (US); Congmin Min, Mountain View, CA (US); Jin Guo, Mountain View, CA (US); Wei Li, Mountain View, CA (US)

(73) Assignees: BEIJING JINGDONG SHANGKE INFORMATION TECHNOLOGY CO., LTD., Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 937 days.

(21) Appl. No.: 16/296,169

(22) Filed: Mar. 7, 2019

(65) Prior Publication Data

US 2020/0286146 A1 Sep. 10, 2020

(51) Int. Cl.
*G06Q 30/06* (2012.01)
*G06N 5/04* (2006.01)
(Continued)

(52) U.S. Cl.
CPC ..... *G06Q 30/0625* (2013.01); *G06F 16/9024* (2019.01); *G06F 17/18* (2013.01); *G06N 5/02* (2013.01); *G06N 5/04* (2013.01)

(58) Field of Classification Search
CPC ............ G06N 5/02; G06N 5/04; G06N 5/022; G06N 7/005; G06F 17/18; G06F 16/9024; G06Q 30/0625
See application file for complete search history.

(56) References Cited

U.S. PATENT DOCUMENTS

| 8,631,026 B1 * | 1/2014 | Tucker ................ G06F 16/2425 707/707 |
| 2014/0019512 A1 | 1/2014 | Ajima et al. |

(Continued)

FOREIGN PATENT DOCUMENTS

| CN | 104123279 A | 10/2014 |
| WO | 2010003129 A2 | 1/2010 |

OTHER PUBLICATIONS

PCT/CN2020/078039 The International Search Report and the Written Opinion, dated May 29, 2020.

*Primary Examiner* — Etienne P Leroux
(74) *Attorney, Agent, or Firm* — Scully, Scott, Murphy & Presser, P.C.

(57) ABSTRACT

A method and system for intelligent guided shopping. The system includes a computing device. The computing device has a processor and a storage device storing computer executable code. The computer executable code, when executed at the processor, is configured to provide inference models based on user search data. Each of the inference models includes nodes and edges between the nodes. Each of the edges pointing from a first node to a second node is characterized with a probability value. The probability value represents a probability of searching a second keyword corresponding to the second node after searching a first keyword corresponding to the first node.

20 Claims, 8 Drawing Sheets

(51) Int. Cl.
*G06F 16/901* (2019.01)
*G06F 17/18* (2006.01)
*G06N 5/02* (2006.01)

(56) References Cited

U.S. PATENT DOCUMENTS

2017/0091318 A1   3/2017  Xue et al.
2017/0300573 A1*  10/2017 He ........................ G06F 16/951
2018/0052885 A1   2/2018  Gaskill et al.

* cited by examiner

400-continued

SYSTEM AND METHOD FOR INTELLIGENT GUIDED SHOPPING

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to intelligent guided shopping, and more particularly to systems and methods for building inference models using user search history available on an e-commerce website and provide interactive intelligent shopping guide based on the inference models.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

E-commerce has been a significant part of social life, and online retail platforms provide billions of merchandise products for sale. When a user enters a search query on an e-commerce platform to find products that match his/her interest, the query may not include sufficient information to locate the exact product. Therefore, after receiving a keyword entered by the customer, the platform may suggest a next search keyword based on some specific product attributes (like color, price, brands, etc.). It's hard for such suggestion to capture the user's real interests or intentions.

Therefore, an unaddressed need exists in the art to address the aforementioned deficiencies and inadequacies.

SUMMARY

In certain aspects, the present disclosure relates to a system for intelligent guided shopping. In certain embodiments, the system includes a computing device. The computing device has a processor and a storage device storing computer executable code. The computer executable code, when executed at the processor, is configured to provide inference models based on user search data. Each of the inference models includes nodes and edges between the nodes. Each of the edges pointing from a first node to a second node is characterized with a probability value. The probability value represents a probability of searching a second keyword corresponding to the second node after searching a first keyword corresponding to the first node.

In certain embodiments, the computer executable code is configured to provide the inference models by: retrieving the user search data, the user search data comprising a plurality of search entries, each of the search entries corresponding to a product and comprising a search sentence; dividing the search entries into product category partitions (PCPs) based on the corresponding products of the search entries, such that the corresponding products of the search entries in the same PCP belonging to a same category; parsing each of the search entries into a keyword sequence and define a first keyword in the keyword sequence as the entry keyword; partitioning each of the PCPs into entry keyword PCPs (EPCPs) based on the entry keywords of the search entries, such that the search entries in a same EPCP have a same entry keyword; and for each of the EPCPs: generating a keyword pair list from the keyword sequences of the search entries in the EPCP, wherein each keyword pair in the keyword pair list comprises two sequentially neighboring keywords from a same one of the keyword sequences; and constructing the inference model of the EPCP using the keyword pair list. Nodes of the inference model are keywords from the keyword pair list, an edge from one of the nodes directing to another one of the nodes is characterized with a probability value, the one of the nodes corresponds to one keyword, the another one of the nodes corresponds to another keyword, and the probability value is calculated by dividing a number of keyword pairs having the one keyword and the another keyword by a number of keyword pairs having the one keyword.

In certain embodiments, the step of parsing each of the search entries into a keyword sequence includes: comparing words in each of the search entries with a keyword set in a product knowledge graph, and keeping the words matching the keyword set as the keywords in the keyword sequence.

In certain embodiments, the computer executable code is further configured to: provide a product knowledge graph (KG), the product KG comprising product, product category, supplier, place of production, brand and vendor of products; receive a query entry from a user; parse the query entry to obtain query keywords and determine an entry keyword (the entry keyword has the highest frequency in the query keywords); build a graph query using the query keywords; execute the graph query against the product KG to obtain a query result; obtain one of the inference models that has the entry keyword; obtain a plurality of top candidate keywords from the one of the inference models based on the probability values between the entry keyword and keywords linked to the entry keyword in the one of the inference model; and provide the top candidate keywords to the user such that the user can select one of the top candidate keywords for further querying. In certain embodiments, the computer executable code is configured to perform the steps of and after obtain one of the inference models when the query result includes more than a predetermined number of entries. In certain embodiments, the predetermined number is 5 or 3.

In certain embodiments, the computer executable code is configured to obtain the top candidate keywords by maximizing the following objective function:

$$F(R) = \sum_{w \in R} p(w', w) + \frac{1}{|R|-1} \sum_{w1 \neq w2 \in R} \mathit{diff}(w1, w2), \text{ and}$$

$$\mathit{diff}(w1, w2) = 1 - \frac{Q_{w1}(KG) \cap Q_{w2}(KG)}{Q_{w1}(KG) \cup Q_{w2}(KG)},$$

where R is a top candidate keyword set, w' is a current keyword, w represents each keyword in R, p(w', w) represents a probability value from the keyword w' to the keyword w, |R| is a number of keywords in R, w1 and w2 are two keywords in R, $Q_{w1}$ is a graph query obtained by adding the keyword w1 to a current graph query, $Q_{w1}$ (KG) is an answer of querying a product knowledge graph using the graph query $Q_{w1}$, $Q_{w2}$ is a graph query obtained by adding the keyword w2 to the current graph query, and $Q_{w2}$ (KG) is an answer of querying the product knowledge graph using the graph query $Q_{w2}$.

In certain embodiments, the top candidate keyword set R includes 3, 4 or 5 candidate keywords.

In certain embodiments, the computer executable code is configured to obtain the top candidate keywords by: obtaining a plurality of keywords, wherein an edge is directed from the current keyword w' to each of the obtained keywords in the inference model; selecting a predetermined number of keywords from the obtained keywords to form one of the candidate keyword sets R; calculating one of the objective functions F(R) for each candidate keyword set R; and determining one of the candidate keyword sets R having a greatest value as the candidate keyword set, and keywords in that candidate keyword set are the top candidate keyword.

In certain embodiments, the computer executable code is configured to obtain the top candidate keywords by: obtaining a plurality of keywords, wherein an edge is directed from the current keyword w' to each of the obtained keywords in the inference model; calculating a pair-wise function for any two keywords in the obtained keywords; ranking the pair-wise functions based on their values to obtain a pair-wise function rank; and selecting top candidate keywords corresponding to pair-wise functions on top of the pair-wise function rank. The pair-wise function for any two keywords w1 and w2 in the obtained keywords is calculated by: $f(w1, w2)=p(w', w1)+p(w', w2)+\text{diff}(w1, w2)$.

In certain embodiments, when the top candidate keywords includes five keywords, the computer executable code is configured to obtain the five top candidate keywords by: defining two keywords corresponding to a first pair-wise function as a first and a second top candidate keywords, wherein the first pair-wise function is ranked the highest in the pair-wise function rank; defining two keywords corresponding to a second pair-wise function as a third and a fourth top candidate keywords, wherein the third and fourth keywords are different from the first and second keywords, and the second pair-wise function is ranked the highest in the pair-wise function rank after the first pair-wise function; and defining one of two keywords corresponding to a third pair-wise function as a fifth top candidate keyword, wherein the two keywords corresponding to the third pair-wise function are different from the first, second, third, and fourth keywords, and the third pair-wise function is ranked the highest in the pair-wise function rank after the second pair-wise function.

In certain embodiments, the computer executable code is configured to obtain the top candidate keywords by: selecting a first keyword from the obtained keywords, where the current keyword w' has a highest probability value to the first keyword; selecting a second keyword from the obtained keywords, wherein the second keyword, when combined with the first keyword, has an objective function value greater than an objective function value of any other one of the obtained keywords and the first keyword; and selecting a subsequent keyword from the obtained keywords until a predetermined number of keywords are selected to form the top candidate keywords, wherein the subsequent keyword has a greatest objective function to previous selected keywords.

In certain aspects, the present disclosure relates to a method for constructing an intelligent shopping guide. In certain embodiments, the method is performed by the system described above. In certain embodiments, a method for constructing an inference model includes: providing, by a computing device, a plurality of inference models based on user search data. Each of the inference models comprises nodes and edges between the nodes, each of the edges pointing from a first node to a second node is characterized with a probability value, and the probability value represents a probability of searching a second keyword corresponding to the second node after searching a first keyword corresponding to the first node.

In certain embodiments, the inference models are provided by: retrieving the user search data, the user search data comprising a plurality of search entries, each of the search entries corresponding to a product and comprising a search sentence; dividing the search entries into product category partitions (PCPs) based on the corresponding products of the search entries, such that the corresponding products of the search entries in the same PCP belonging to a same category; parsing each of the search entries into a keyword sequence and define a first keyword in the keyword sequence as the entry keyword; partitioning each of the PCPs into entry keyword PCPs (EPCPs) based on the entry keywords of the search entries, such that the search entries in a same EPCP have a same entry keyword; and for each of the EPCPs: generating a keyword pair list from the keyword sequences of the search entries in the EPCP, wherein each keyword pair in the keyword pair list comprises two sequentially neighboring keywords from a same one of the keyword sequences; and constructing the inference model of the EPCP using the keyword pair list. Nodes of the inference model are keywords from the keyword pair list, an edge from one of the nodes directing to another one of the nodes is characterized with a probability value, the one of the nodes corresponds to one keyword, the another one of the nodes corresponds to another keyword, and the probability value is calculated by dividing a number of keyword pairs having the one keyword and the another keyword by a number of keyword pairs having the one keyword.

In certain embodiments, the step of parsing each of the search entries into a keyword sequence comprises: comparing words in each of the search entries with a keyword set in a product knowledge graph, and keeping the words matching the keyword set as the keywords in the keyword sequence.

In certain embodiments, the method further includes: providing a product knowledge graph (KG), the product KG comprising product, product category, supplier, place of production, brand and vendor of products; receiving a query entry from a user; parsing the query entry to obtain query keywords and determining an entry keyword from the query keywords (the entry keyword has the highest frequency in the query keywords); building a graph query using the entry keyword; executing the graph query against the product KG to obtain a query result; obtaining one of the inference models that has the determined keyword as entry keyword; obtaining a plurality of top candidate keywords from the one of the inference models based on the probability values between the entry keyword and keywords linked to the entry keyword in the one of the inference model; and providing the top candidate keywords to the user such that the user can select one of the top candidate keywords for further querying. In certain embodiments, the computer executable code is configured to perform the steps of and after obtaining one of the inference models when the query result includes more than a predetermined number of entries. In certain embodiments, the predetermined number is 5 or 3.

In certain embodiments, the step of obtaining the top candidate keywords is performed by maximizing the following objective function:

$$F(R) = \sum_{w \in R} p(w', w) + \frac{1}{|R|-1} \sum_{w1 \neq w2 \in R} \mathit{diff}(w1, w2), \text{ and}$$

$$\mathit{diff}(w1, w2) = 1 - \frac{Q_{w1}(KG) \cap Q_{w2}(KG)}{Q_{w1}(KG) \cup Q_{w2}(KG)},$$

where R is a top candidate keyword set, w' is a current keyword, w represents each keyword in R, p(w', w) represents a probability value from the keyword w' to the keyword w, |R| is a number of keywords in R, w1 and w2 are two keywords in R, $Q_{w1}$ is a graph query obtained by adding the keyword w1 to a current graph query, $Q_{w1}$ (KG) is an answer of querying a product knowledge graph using the graph query $Q_{w1}$, $Q_{w2}$ is a graph query obtained by adding the keyword w2 to the current graph query, and $Q_{w2}$ (KG) is an answer of querying the product knowledge graph using the graph query $Q_{w2}$.

In certain embodiments, the top candidate keyword set R comprises 3 to 5 candidate keywords.

In certain embodiments, the step of obtaining the top candidate keywords is performed by: obtaining a plurality of keywords, wherein an edge is directed from the current keyword w' to each of the obtained keywords in the inference model; selecting a predetermined number of keywords from the obtained keywords to form one of the candidate keyword sets R; calculating one of the objective functions F(R) for each candidate keyword set R; and determining one of the candidate keyword sets R having a greatest value as the candidate keyword set, and keywords in that candidate keyword set are the top candidate keyword.

In certain embodiments, the step of obtaining the top candidate keywords is performed by: obtaining a plurality of keywords, wherein an edge is directed from the current keyword w' to each of the obtained keywords in the inference model; calculating a pair-wise function for any two keywords in the obtained keywords; ranking the pair-wise functions based on their values to obtain a pair-wise function rank; and selecting top candidate keywords corresponding to pair-wise functions on top of the pair-wise function rank. The pair-wise function for any two keywords w1 and w2 in the obtained keywords is calculated by: $f(w1, w2) = p(w', w1) + p(w', w2) + \mathit{diff}(w1, w2)$.

In certain embodiments, the step of obtaining the top candidate keywords is performed by: selecting a first keyword from the obtained keywords, wherein the current keyword w' has a highest probability value to the first keyword; selecting a second keyword from the obtained keywords, wherein the second keyword, when combined with the first keyword, has an objective function value greater than an objective function value of any other one keyword and the first keyword; and selecting a subsequent keyword from the obtained keywords until a predetermined number of keywords are selected to form the top candidate keywords, wherein the subsequent keyword has a greatest objective function to previously selected keywords.

In certain aspects, the present disclosure relates to a non-transitory computer readable medium storing computer executable code. The computer executable code, when executed at a processor of a computing device, is configured to perform the method as described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION

Figure 1:
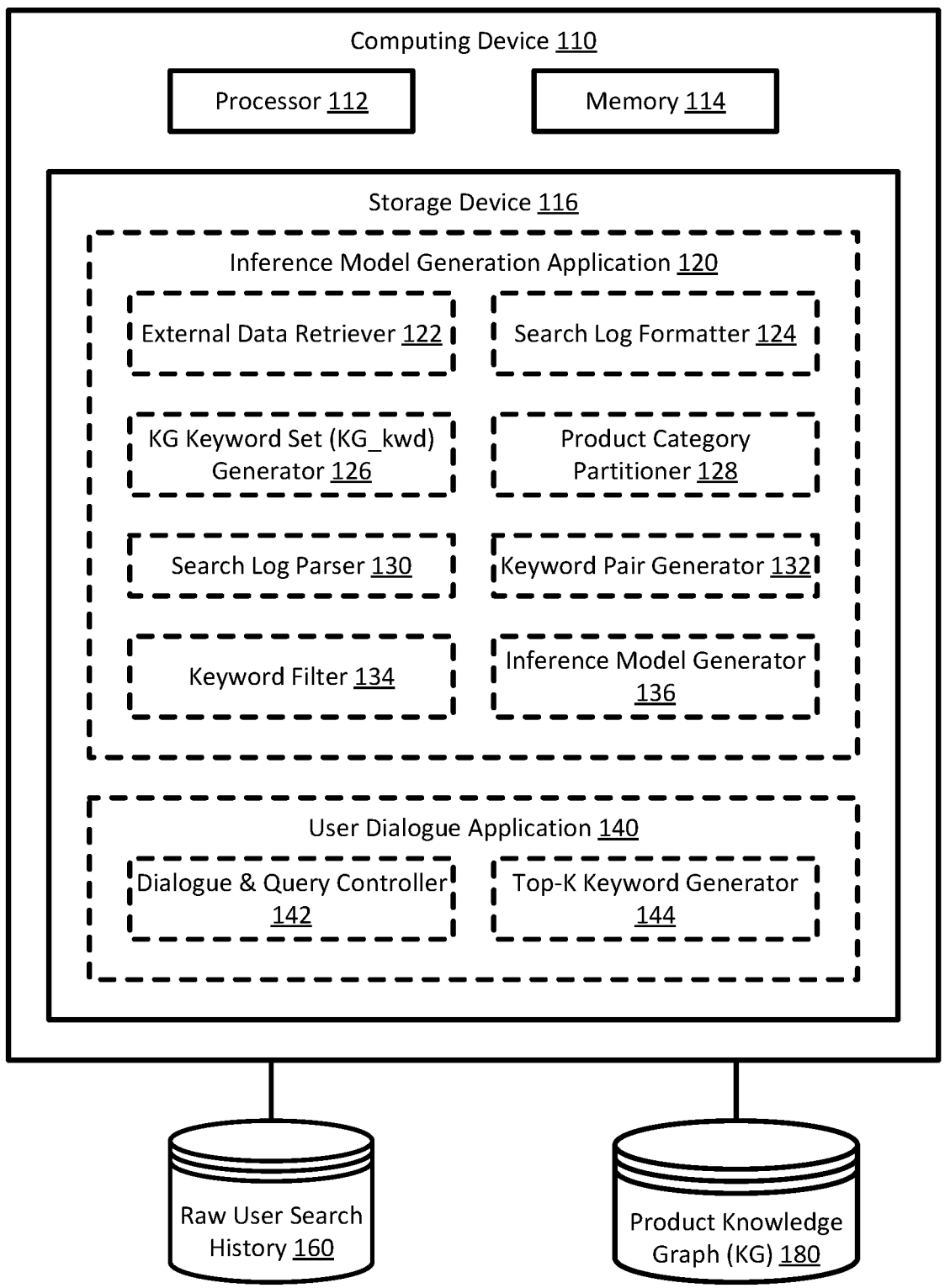
FIG. 1 schematically depicts an intelligent shopping guide system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspects, the present disclosure relates to systems and methods to handle both specific user questions and open-ended or vague user questions on products. In certain embodiments, in response to open-ended or vague user questions, the disclosure provides suggestions to users not only based on some specific product attributes (like color, price, brands, etc.) but also based on users' diversified interest. In certain embodiments, in order to detect the users' diversified interest, the present disclosure utilizes the rich and large volume of historical user search data available on ecommerce websites.

Specifically, the present disclosure provides a framework for an intelligent shopping guide system, to enable users to find the products they are looking for quickly. Further, the system according to certain embodiments of the present disclosure suggests the most likely product keywords from a large number of options available to meet the requirement by a limited mobile platform screen size. As a result, in certain embodiments, a system is composed of two parts: 1) an inference model builder which analyzes vast amount of historical user search data, and builds inference models regarding user search behavior; and 2) a dialogue system which interacts with users by providing the most likely next search keywords, to enable users to find their products or product attributes quickly.

FIG. 1 schematically depicts an intelligent shopping guide system according to certain embodiments of the present disclosure. As shown in FIG. 1, the system 100 includes a computing device 110, user search history 160, and product knowledge graph (KG) 180. In certain embodiments, the computing device 110 may be a server computer, a cluster, a cloud computer, a general-purpose computer, or a specialized computer, which constructs inference models based on historical user search data, and generates search keyword suggestions based on user selection using the product knowledge graph (KG) and the inference models. In certain embodiments, the computing device 110 may communicate with other computing devices or services, so as to obtain user search data and product data from those computing devices to update the inference models. In certain embodiments, the communication is performed via a network, which may be a wired or wireless network, and may be of various forms, such as a public network and a private network, or via non-transitory computer media including but not limited to flash drive, USB drives, hard drive, floppy disk, SD card, optical drive, or any other portable data storage media. In certain embodiments, the computing device 110 provides an interface for each of a large number of user computing devices, such as personal computers, tablet, or smart phones, such that users can communicate with the computing device 110 via the interface, send queries on products, read suggested keywords by the computing device 110, select one of the suggested keywords to refine queries, and obtain final result from the computing device 110.

The user search history 160 is accessible to the computing device 110, and may be updated regularly. In certain embodiments, the user search history 160 records raw data of the user searches, each entry of the raw search data may include the time of the search, the customer performed the search, the keywords used by the customer, the product related to the search, etc. In certain embodiments, one raw search data entry may not include all the above listed information. For example, a raw search data entry may not result in a specific product. The user search history 160 may collect searches customers made on a home page of an e-commerce platform, and/or questions customers brought under a specific products. The user search history 160 may be stored on the computing device 110, or on other server computing devices that is accessible by the computing device 110.

The product knowledge graph (KG) 180 is generated from product database of the e-commerce platform. In certain embodiments, the product KG 180 contains six types of nodes: products, category, supplier, place of production, brand and shop. The products nodes may include the identifications of the products, the title or name of the products, the feature of the products such as color, weight or storage size; the category nodes may include different levels of categories of the products, such as "clothing" in a first level category, "men's pants" in a second level category, and "Jeans" in a third level category; the supplier nodes may include factories making the products; the place of production may include where the products are made; the brand may include brand name of the product; and the shop may include name or identification of a seller on the e-commerce platform. Each node has a name and a set of attributes which are represented by key-value pairs. For example, a product node may have an attribute "Color:Red." Specifically, each product has a unique product id, denoted as sku_id. The edges represent the relationship between nodes. For example, an edge between a product node and a supplier node represents that this product is "produced by" this supplier. The product KG 180 may be stored on the computing device 110, or on other server computing devices that is accessible by the computing device 110.

As shown in FIG. 1, the computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the computing device 110. The processor 112 can execute an operating system (OS) or other applications of the computing device 110. In some embodiments, the computing device 110 may have more than one CPU as the processor, such as two CPUs, four CPUs, eight CPUs, or any suitable number of CPUs. The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114. The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, solid-state drive (SSD) or any other types of data storage devices. In certain embodiments, the storage device 116 may be a local storage, a remote storage, or a cloud storage. In certain embodiments, the computing device 110 may have multiple storage devices 116, which may be identical storage devices or different types of storage devices, and the applications of the computing device 110 may be stored in one or more of the storage devices 116 of the computing device 110. In certain embodiments, the computing device 110 is a cloud computer, and the processor 112, the memory 114 and the storage device 116 are shared resources provided over the Internet on-demand.

As shown in FIG. 1, the storage device 116 includes an inference model generation application 120 and a user dialogue application 140. The inference model generation application 120 is configured to construct inference models and update the models using the raw user search history 160 and optionally the product KG 180. The user dialogue application 140 drives interactive user search chat session and uses the inference models to suggest next search keywords to users. As described above, the raw user search history 160 is retrievable from the e-commerce website and made available to the inference model generation application 120, more specifically, to the external data retriever 122. The product KG 180 is generated from the merchant's product database and made available to the inference model generation application 120. The product KG 180 is retrievable by the external data retrieve 122 and used by the KG keyword set (KG_kwd) generator 126 as well as by the dialog & query controller 142.

The inference model generation application 120 includes, among other things, an external data retriever 122, a search log formatter 124, a KG keyword set generator 126, a product category partitioner 128, a search log parser 130, a keyword pair generator 132, a keyword filter 134, an inference model generator 136. In certain embodiments, the inference model generation application 120 may include other applications or modules necessary for the operation of the inference model generation application 120. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some or all of the modules of the inference model generation application 120 may be located at a remote computing device or distributed in a cloud.

The external data retriever 122 is configured to retrieve the raw user search history from the external data source raw user search history 160 and the product knowledge graph (KG) from the external data source product knowledge graph (KG) 180, send the retrieved user search history to the search log formatter 124, and sends the KG to the KG keyword set (KG_kwd) generator 126. The external data retriever 122 may retrieve the raw search histories in a specified time range, such as last quarter (season), last year, last five years, or may be a certain number of most recent data entries, such as the last 1 million data entries, the last 10 million data entries, or the last 1 billion data entries, or all search logs available. In one example, the external data retriever 122 is configured to retrieve the most recent 10 billion search histories.

The search log formatter 124 is configured to, upon receiving or retrieving raw user search history from the external data retriever 122, transform each data entry of the user search history into an entry of a search log, and send the formatted search log to the product category partitioner 128. In certain embodiments, the search log is stored as a relational table. In certain embodiments, the search log has the following four columns/attributes: search time, search user id, search sentence, and product sku_id. In certain embodiments, if the raw search data entry does not have the product sku_id info available, that data entry is discarded. One resulting search log example is "1485219945761, jd_6d2ca1099ef04, Huawei mates full netcom (华为 mates 全网通), 1774083971," where "1485219945761" is the time stamp of the search, "jd_6d2ca1099ef04" is the id of the user performing the search, "Huawei mates full netcom" is the search sentence, and 1774083971 is the product_id corresponding to the search. In certain embodiments, not all of the above listed information are necessary for constructing the inference models. For example, the search sentence only may be sufficient to construct the inference models and it may not necessary to have the time stamp, the user id and the product id.

The KG keyword set (KG_kwd) generator 126 is configured to, upon receiving or retrieving product knowledge graph (KG) from the external data retriever 122, generate the universal keyword set (KG_kwd), and send the KG_kwd to the keyword filter 134. This is done by traversing the product knowledge graph KG and collecting the information from each node. In KG, each node has a name and a set of attributes which are represented by key-value pairs. KG_kwd contains all node types, names, node attribute keys and values. In certain embodiments, each keyword is associated with an integer number which indicates how many times it occurs in the KG. The integer number associated with a keyword is also called the frequency of that keyword. The KG_kwd is used later to filter the keyword pairs generated from user search history by keyword filter 134. The KG_kwd is also accessible to the user dialogue application 140. In certain embodiments, the KG_kwd is generated in the server having the product KG and is part of the product KG. Under this situation, the inference model generation application 120 doesn't have the KG_kwd generator 126 for generating the KG_kwd. Instead, the inference model generation application 120 retrieves the KG_kwd from the product KG 180.

The product category partitioner 128 is configured to, upon receiving historical user search logs from the search log formatter 124, separate the search logs into different partitions based on their product categories. Product category info is derived from the product sku_id info in each search log since each sku_id belongs to a product category (e.g., "iPhone" belongs to the "Mobile Phone" category). Search logs belonging to the same product category form a product category partition (PCP). The product category partitioner 128 may further retrieve search logs in a specified time range, such as last quarter (season), last year, last five years, or may be a certain number of most recent data entries, such as the last 1 million data entries, the last 10 million data entries, or the last 1 billion data entries, or all search logs. In one example, the product category partitioner 128 retrieves the recent 10 billion search logs. The product category partitioner 128 is further configured to, after generating the PCPs, send the PCPs to the search log parser 130.

The search log parser 130 is configured to, upon receiving the partitioned search logs (PCPs), decompose the search sentence of each of the search logs in the PCPs into a keyword sequence. For example, the search sentence "Huawei mates full netcom (华为 mates 全网通)" of a search log is decomposed to "Huawei//mates//full netcom (华为 mates 全网通)." In each of the parsed keyword sequences, the first keyword is termed entry keyword of that keyword sequence. The search log parser 130 then constructs an entry keyword set by collecting the first keyword from all the keyword sequences for each PCP. After determining the entry keywords, the search log parser 130 further divides the parsed search logs in each PCP into different subsets; each subset is called an entry product category partition (EPCP), which consists of search logs which share the same first keyword (entry keyword). Then the search log parser 130 sends the sub-partitions (EPCPs) with generated keyword sequences to the keyword pair generator 132.

The keyword pair generator 132 is configured to, upon receiving keyword sequences from each EPCP, generate a keyword pair list. For each keyword sequence in one EPCP, keyword pairs are generated by pairing every keyword and the keyword following it (if it exists). For example, for the keyword sequence "Huawei//mates//full netcom", two keyword pairs "Huawei//mates" and "mates//full netcom" are generated. The keyword pair generator 132 is configured to generate keyword pairs for each of the EPCPs, add the generated keyword pairs together to form a keyword pair list, and send the keyword pair list to the keyword filter 134.

The keyword filter 134 is configured to, upon receiving the keyword pair list from the keyword filter 132 and the KG_kwd set from the KG_kwd generator 126, remove unneeded keyword pairs. Specifically, if at least one keyword from a keyword pair is not present in the KG keyword set, the keyword filter 134 is configured to remove the keyword pair from the keyword pair list, because we know there will be no match during the graph query involving this keyword pair. The keyword filter 134 is further configured to send the filtered keyword pair list to the inference model generator 136.

The inference model generator 136 is configured to, upon receiving the filtered keyword pair list from the keyword filter 134, generate an inference model for each EPCP. The inference model generator 136 first initializes an inference model graph by inserting nodes. Each node represents a keyword in the keyword pair. If the same keyword appears in multiple keyword pairs, only one node is inserted for that keyword. The nodes corresponding to the entry keywords are called entry nodes.

For each keyword pair, the inference model generator 136 then first locates the two corresponding nodes in the inference model graph, then it inserts a temporary edge from the node of the first keyword in the keyword pair to the node of the second keyword of the same keyword pair. Please note there could be duplicate keyword pairs in the keyword pair list and multiple edges are inserted in this case. Further, the direction of each temporary edge is directed from the first keyword in a corresponding keyword pair to the second keyword in the keyword pair.

Figure 2A:
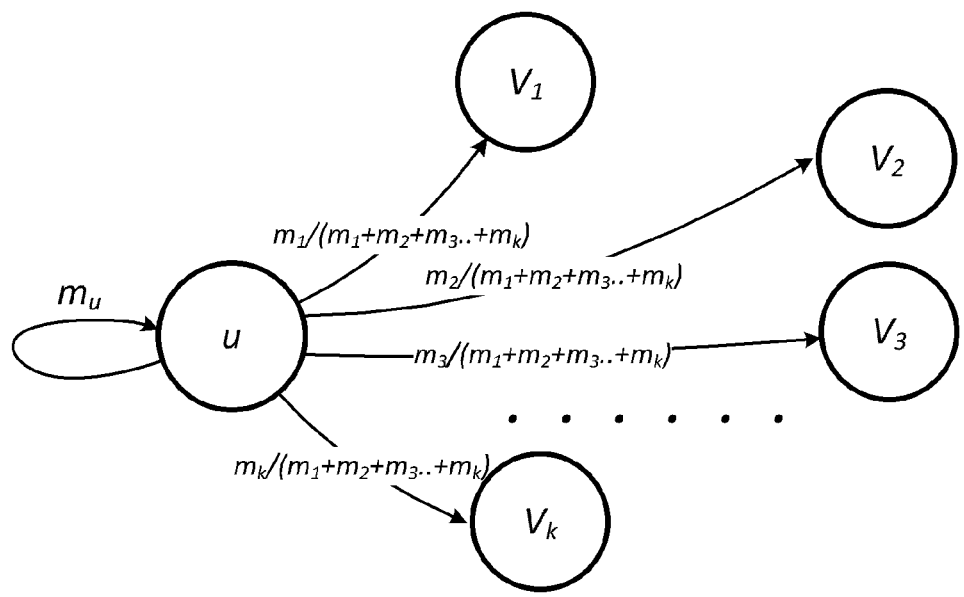
FIG. 2A schematically depicts an example of calculating probabilities in an inference model according to certain embodiments of the present disclosure.

After all nodes and temporary edges have been inserted into the inference model graph, the inference model generator 136 calculates the probability for the temporary edges from one node (keyword) u to another node (keyword) v. The probability represents the likeliness the users searched keyword v after keyword u collectively from the historical user search data. So, for each node u, the inference model generator 136 first counts the number of temporary outgoing edges as m. Then for each of its neighboring nodes v, it counts the number of temporary edges from u to v as n. Then the probability of the edge from u to v is calculated as n/m. After the probability calculation is complete, only one edge is kept from u to v and all other temporary edges are merged/removed. The resulting graph is the inference model for the EPCP; it has an entry point represented by the entry node. The model represents the probability distribution from one node to all its neighboring nodes, the probability being the likeliness of searching one keyword after another from historical data. FIG. 2A schematically shows an example for calculating probabilities in the inference model. As shown in FIG. 2A, for a node u, there are k neighboring nodes $v_1$, $v_2$, $v_3$, ..., $v_k$, that is, there are k filtered keyword pairs (u, $v_1$), (u, $v_2$), (u, $v_3$), ..., (u, $v_k$) available. The number of filtered keyword pairs are $m_1$ number of (u, $v_1$), $m_2$ number of (u, $v_2$), $m_3$ number of (u, $v_3$), ..., $m_k$ number of (u, $v_k$). Therefore, the probability value for the u to $v_1$ edge is $$\frac{m_1}{m_1 + m_2 + m_3 + ... + m_k},$$

the probability value for the u to $v_2$ edge is $$\frac{m_2}{m_1 + m_2 + m_3 + ... + m_k},$$

the probability value for the u to $v_3$ edge is $$\frac{m_3}{m_1 + m_2 + m_3 + ... + m_k},$$

the probability value for the u to $v_k$ edge is $$\frac{m_k}{m_1 + m_2 + m_3 + ... + m_k}.$$

In certain embodiments, the keyword pair (u, u) is filtered by the keyword filter 134 during the filtering procedure. In other embodiments, the keyword pair (u, u) is not filtered by the keyword filter 134, and the above calculation incorporate the probability value of u to u as well. Under this situation, the probability value for the u to u edge is $$\frac{m_u}{m_1 + m_2 + m_3 + ... + m_k + m_u}.$$

the probability value for the u to $v_k$ edge is $$\frac{m_k}{m_1 + m_2 + m_3 + ... + m_k + m_u}.$$

Figure 2B:
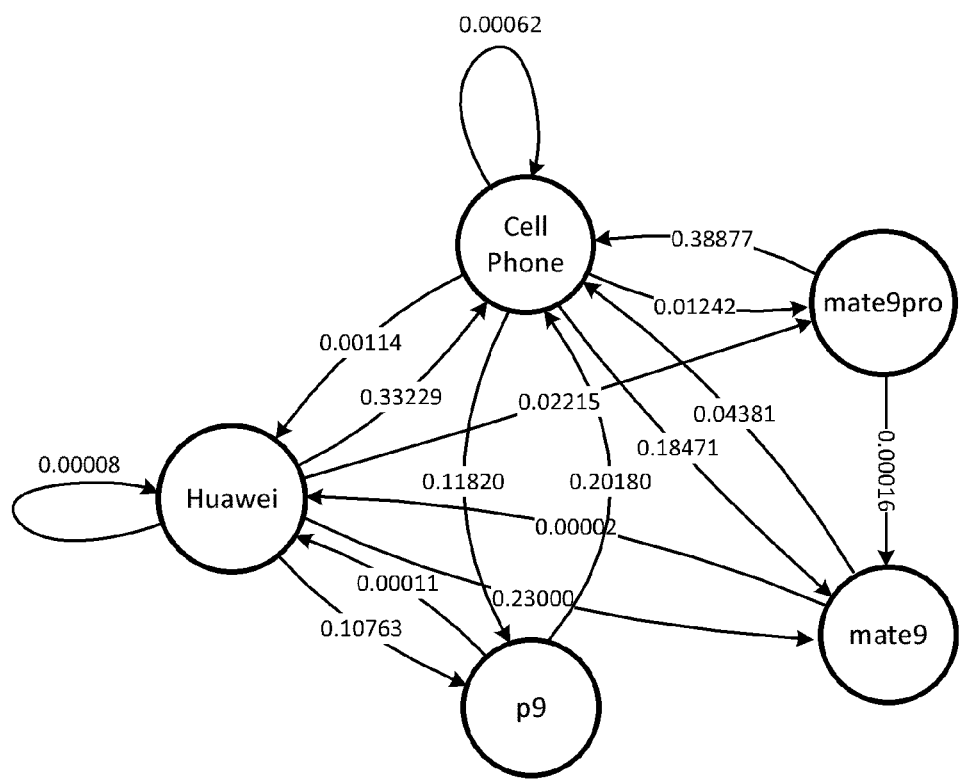
FIG. 2B schematically depicts an example of a portion of an inference model according to certain embodiments of the present disclosure.

In one example, we may have "Huawei"–0.25–>"Mate9," "Huawei"-0.11–>"P9," etc. This means, the users as a whole have a 25% probability searching "Mate9" after searching "Huawei," and 11% probability searching "P9" after searching "Huawei." An example of a portion of an inference model is presented in FIG. 2B. As shown in FIG. 2B, an inference model is a graph consisting of nodes and edges. Each edge has a direction from one node to another node, and a probability value associated with the edge. The probability value represents the probability that a user searches ending keyword after searching the starting keyword of the edge. There are edges from the node "Huawei" to "cellphone," "p9," "mate9," "mate9pro," etc. The value of each edge is the probability a user searches "cellphone," "p9," "mate9," "mate9pro" respectively after searching "Huawei," which are 0.33229, 0.10763, 0.23000, and 0.01242. The inference model may be used by the user dialog application 140, more specifically, by the top-k keyword generator 144.

The user dialog application 140 includes, among other things, a dialog and query controller 142 and a top-k keywords generator 144. In certain embodiments, the user dialog application 140 may include other applications or modules necessary for the operation of the user dialog application 140. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some or all of the modules of the user dialog application 140 may be located at a remote computing device or distributed in a cloud.

The dialog & query controller 142 is configured to provide a user interface to start an interactive chat session with the user, receive an initial user input sentence, and upon receiving the initial user input sentence, decompose the input sentence into a keyword sequence. The dialog & query controller 142 is further configured to select the keyword in the keyword sequence that has the highest frequency in the KG keyword set as the entry keyword, and loads the corresponding inference model having that entry keyword into memory when needed.

After decomposing the input sentence into the keyword sequence and loading the corresponding inference model and the product KG, the dialog & query controller 142 first builds a query graph based on the entry keyword, and queries the product KG using the query graph (in certain embodiments, the corresponding inference model may be determined and loaded later when necessary). The query graph contains only one node based on the entry keyword. If the entry keyword is an attribute key, the dialog & query controller 142 adds a node with this attribute key. If the entry keyword is an attribute value, the dialog & query controller 142 locates its corresponding key and add a node with this attribute key-value pair. For example, if the entry keyword is "color," the dialog & query controller 142 forms the query graph to include a node "color." If the entry keyword is "red," the dialog & query controller 142 forms the query graph to include a node "color" with the attribute key-value pair of "color-red."

A graph query is a bridge between the user search keywords and the product knowledge graph KG. It is used to generate the next search keyword candidates, which could be a set of products or a set of attributes. A graph query is a graph which contains a set of nodes and edges. A node contains a type, name, and a set of attributes and an edge represents the relationship between two nodes. Given a graph query and the KG, subgraph isomorphism is used to answer the query. A subgraph isomorphism problem is a computational task in which two graphs G and H are given as input, and one must determine whether G contains a subgraph that is isomorphic to H. Further details may be found in https://en.wikipedia.org/wiki/Subgraph isomorphismproblem, which is incorporated herein by reference in its entirety.

After querying the product KG using the query graph, the dialog & query controller 142 obtains a query result. In certain embodiments, subgraph isomorphism is used to find the query result. For example, if we have query graph with two nodes, one node with type "Cellphone," one node with type "Company" and name "Google," and one edge between them with type "producedBy." Then the answer is all phones produced by Google, like Pixel, etc. In certain embodiments, the query result against the product KG using the query graph may have no results or one or more results.

When the query result is empty (no result), the search process may stop or alternatively, the search process may modify the query graph to obtain query result. For example, one or more words in the query graph may be deleted such that the modified query has less restriction, so as to obtain certain query result. For example, if we want to find a "blue iPhone X," which is processed and used to query the product KG. Since there exists no iPhone X with color blue, there is no match from the product KG. Under this situation, the system will delete "blue" or "iPhone X" from the query graph to obtain a modified query graph, and return some partial query result from the modified query graph. For example, the query result is blue cellphones (but not iPhone X) if deleting the "iPhone X" from the query graph, or the query result is iPhone X (but with other colors) if deleting "Blue" from the query graph. When the partial result is obtained, the number of result entries in the partial result is determined, and the process continues based on the number of result entries.

When the query result includes one to a predetermined number of result entries from the product KG, such as 1-5 result entries or 1-3 result entries (the predetermined number is 5 or 3), the query result is then presented to the user. For example, a query graph having "color" of a cell phone may result in a query result having the color "red." Under this situation, the dialog & query controller 142 is configured to present the exact result to the user without resorting to the inference model.

When the query result includes more than the predetermined number of result entries, the prompt mechanism is intrigued, and the dialog & query controller 142 is configured to send the query graph to the top-k keyword generator 144.

The dialog & query controller 142 is further configured to, upon receiving the top-k keyword from the top-k keyword generator 144, checks whether the chat session can be stopped. The standard for stopping the chat session includes that the user finds what he/she want, stops to click the suggested keywords, closes the chat window, or there is no sufficient top-k keyword anymore provided by the top-k keyword generator 144.

The dialog & query controller 142 is further configured to, when the user select one of the top-k keywords, add the selected top-k keyword to the previous query graph to obtain an updated query graph, and use the updated query graph to query the product KG, and based on the number of result entries in the query result, repeat the process described above.

The top-k keyword generator 144 is configured to, upon receiving the query graph (when the query result includes more than the predetermined number of result entries), obtain top-k keywords based on the inference model and the product KG, and presents the top-k keywords to the user for the user's selection. In certain embodiments, the inference model is determined based on the entry keyword and is loaded to the memory at this time.

In certain embodiments, the obtaining of the top-k keywords involves forming updated query graphs by adding different candidate keywords to the current query graph, and query the product KG using those updated query graphs to calculate their object function values, and obtains the top-k keywords from the candidate keywords based on the object function values. Specifically, the query result using the current query graph may include thousands of result entries. Under this situation, the top-k keyword generator 144 selects candidate keywords from the inference model (all the keywords connected to the entry keyword or all the keywords other than the entry keyword), and respectively add each of the candidate keywords to the current query graph to form the updated query graphs. Those updated query graphs are each used to query the product KG, and the query results are used to calculate the object functions of the updated query graphs. The updated query graphs that have highest object functions are then selected, and the corresponding candidate keywords (top-k of them) from the selected updated query graphs are presented to the user. The calculation of the object function may be performed by an exact algorithm, a 2-approximation algorithm or a heuristic algorithm described later in this disclosure. In certain embodiments, k is a positive integer in a range of 2-8 (kindly note k here is a number independent from the predetermined number described above, and k and the predetermined number may be the same or different from each other). In certain embodiments, k is in a range of 3-5. In one embodiment, k is 5. That is, the five keywords from the inference model have high object function values and are likely to be the next keywords after the entry keywords (or after the keywords in the previous round), and those five keywords are provided to the user. When the user choose one keyword from the five keywords, the chosen keyword is used to update the previous query graph. In certain embodiments, when there is no sufficient candidate keywords to select from (for example 1 or 2 candidate keywords), the resulting keyword may be less than the defined five keywords limit. Under this situation, the top-k keyword generator 144 may present all those candidate keywords to the user, and instruct the application that when the user select one of the candidate keywords: form an updated query graph using the selected keyword and the previous query graph, use the updated query graph to query the product KG, and present the query result or the top result entries of the query result to the user (such as the top 3 result entries).

As described above, the top-k keyword generator 144 is configured to, upon receiving the graph query (when the query result by the graph query include greater than the pre-determined number of result entries), select the top-k diversified keywords based on the inference model and the product KG. The goal here is to select the top-k keywords with the highest combined probabilities among all possible candidates, as well as the highest answer coverage. The top-k keywords are generated using following formula:

$$F(R) = \sum_{w \in R} p(w', w) + \frac{1}{|R|-1} \sum_{w1 \neq w2 \in R} \text{diff}(w1, w2), \text{ and}$$

$$\text{diff}(w1, w2) = 1 - \frac{Q_{w1}(KG) \cap Q_{w2}(KG)}{Q_{w1}(KG) \cup Q_{w2}(KG)},$$

In the above formula, R is the top candidate keyword set, w' is the current keyword, w represents each keyword in R, p(w', w) represents the probability value from the keyword w' to the keyword w in the inference model, |R| is a number of keywords in R, w1 and w2 are two keywords in R, $Q_{w1}$ is a graph query obtained by adding the keyword w1 to a current graph query, $Q_{w1}$ (KG) is an answer of querying a product knowledge graph using the graph query $Q_{w1}$, $Q_{w2}$ is a graph query obtained by adding the keyword w2 to the current graph query, and $Q_{w2}$(KG) is an answer of querying the product knowledge graph using the graph query $Q_{w2}$. In certain embodiments, the top candidate keyword set R includes 3 to 5 candidate keywords, and in one embodiments the top candidate keyword set R includes 5 candidate keywords.

The function diff(w1, w2) measures the dissimilarity between two candidate keywords w1 and w2, and is calculated using a standard Jaccard distance between two sets respectively containing the keywords w1 and w2. For the detailed description of Jaccard distance, please refer to https://en.wikipedia.org/wiki/Jaccard_index, which is incorporated herein by reference in its entirety. The overall goal of top-k keyword generator 144 is to select a set of top-k keywords which can maximize the objective function F(R). F(R) has two requirements. First requirement is to seek those candidate keywords with high probabilities. At the same time, it also needs the difference among those candidates to be big. In certain embodiments, the top-k keyword generator 144 is configured to using at least one of the following three methods to obtain the top-k keywords that optimize the function F(R).

In certain embodiments, the top-k keyword generator 144 is configured to use the first method-exact method, to obtain the top-k keywords. This algorithm enumerates all possible top-k keyword sets and selects the best set. This is a nondeterministic polynomial time problem (NP-hard problem). For example, if there are 100 candidate keywords, and to select the top 5 keywords, there are 100×99×98×97×96/(5×4×3×2), more than 75 million ways to select. The top-k keyword generator 144 is configured to calculate the F(R) for each selection, and determine the selection has the greatest F(R) value as the result. This method guarantees the optimal answer but is slow and may not be practical in actual implementation. However, if the calculation power of hardware is sufficient, the top-k keyword generator 144 may prefer to use this method to obtain the top-k keywords.

In certain embodiments, the top-k keyword generator 144 is configured to use the second method-approximation method, to obtain the top-k keywords. In this method, the objective function for selecting a pair of keyword is defined as:

$$F(w1,w2)=p(w',w1)+p(w',w2)+\text{diff}(w1,w2).$$

The top-k keyword generator 144 is configured to obtain the top-k keywords using the following steps: (1) Given the keyword w' selected by the user in the previous round (or simply the entry keyword in the first round), the system first finds all outgoing neighbors of w' in the inference model graph as the candidate set 0. (2) For each keyword w in 0, the system generates an updated query by integrating w into current query Q. (3) For each updated query $Q_w$, its answer set in $Q_w$(KG) is calculated by the query index. If $Q_w$(KG) is empty, the updated query and the corresponding keywords w is discarded. (4) For each pair of candidate keywords in 0, the pairwise objective function F(w1, w2) is calculated. (5) The candidate pairs are ranked by their objective function value from high to low. Keep selecting candidate pairs and adding candidates into W until W reaches size k; if k is an odd number, the top-k keyword generator 144 can simply keep one keyword from the last pair and discard the other. All already chosen keywords don't participate in the next round of selection. (6) The selected candidates are returned to users as the top-k suggested keywords. After the user selects one of the top-k suggested keywords, the procedures (1)-(6) are repeated, until the user is satisfied with the result, or no more top-k suggested keywords are available.

This is an approximation algorithm, like the name suggests. The performance of this algorithm is much better than the exact algorithm (fast speed with reasonable results), but it does not guarantee optimal solution.

In certain embodiments, the top-k keyword generator 144 is configured to use the third method-heuristic method, to obtain the top-k keywords. In this method, the top-k keyword generator 144 selects the keywords that maximizes $f$ (R ∪ w) until |R|=k. In other words, when k keywords is needed, the top-k keyword generator 144 determines values of the function $f$ (R ∪ w) for all the candidate keywords, such as all the other keywords in the inference model that are not in the query graph. Of the candidate keywords, k keywords with the highest values of the function $f$ (R ∪ w) are selected as the top-k keywords. Here $f$(R ∪ w)=F(R ∪ w)−F(R), that is, $f$ (R ∪ w) is the difference between the F function before and after one of the candidate keywords is added.

In certain embodiments, the second or third methods are used based on the calculation source available. In certain embodiments, the first method may also be used when the calculation power is not a limiting factor.

After top-k keyword generator 144 determines the top-k keywords and present the top-k keywords to the user, the user select one of the top-k keywords. The dialog & query controller 142 then updates the query graph with this newly selected keyword, and queries the product knowledge graph (KG) using the updated query graph again to obtain the query result. If the query result includes more than the predetermined number of result entries, the top-k keyword generator 144 then uses the inference model and the product KG to generate next set of top-k keywords based on the query result, and presents the new round of top-k keywords to the user. The user makes another selection. This process continues until the predefined chat stopping criteria have been met. The predefined stopping criteria could be, but is not limited to: the user is satisfied with the answer, or the current suggested number of keywords is smaller than a predefined limit, such as five (in other words, when using the current query graph to search against the product KG, there are only the predetermined number of result entries, such as 1-5 result entries).

Figure 3:
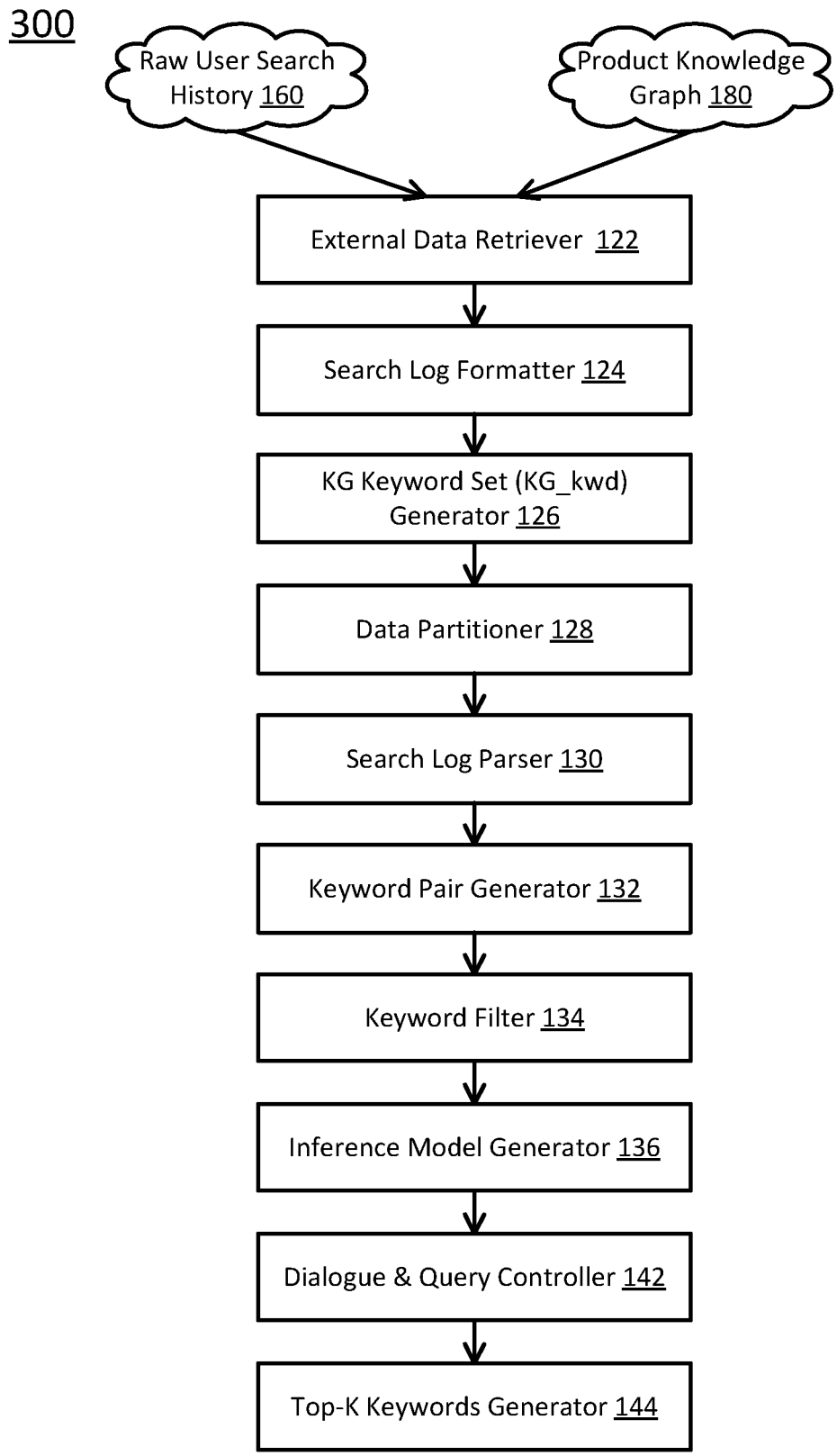
FIG. 3 schematically depicts a flow chart to build an intelligent shopping guide system consisting of inference models built from all users' historical search data and a dialog system interacting with users according to certain embodiments of the present disclosure.

FIG. 3 schematically depicts a flow chart to build and update an intelligent shopping guide system according to certain embodiments of the present disclosure. In certain embodiments, the building and updating the intelligent shopping guide system is implemented by the server computing device 110 shown in FIG. 1.

As shown in FIG. 3, in the flowchart 300, the external data retriever 122 retrieves raw user search history from the external data source raw user search history 160 and product knowledge graph (KG) from the external data source product knowledge graph 180, sends the raw user search history to the search log formatter 124, and sends the product KG to the KG keyword set (KG_kwd) generator 126.

The search log formatter 124, upon receiving the raw user search history from the external data retriever 122, transforms each data entry into a reformatted search log. The search log formatter 124 sends the formatted search logs to the data partitioner 128.

The KG keyword set (KG_kwd) generator 126, upon receiving the product KG from the external data retriever 122, generates the universal KG keyword set (KG_kwd). The KG_kwd generator 126 then sends the generated KG_kwd to the keyword filter 134.

The product category partitioner 128, upon receiving historical user search logs from the search log formatter 124, separates the search logs into different partitions based on their product categories (PCPs). Search logs belonging to the same product category form a PCP. The product category partitioner 128 then sends the partitioned search logs (PCPs) to the search log parser 130.

The search log parser 130, upon receiving the partitioned search logs (PCPs), decomposes the query sentence of each search log into a keyword sequence, and further partition each PCP into subsets based on the first keyword (entry keyword) in their search sentences, each of the subsets is termed the entry word PCP (EPCP). The search log parser 130 then sends the EPCP with keyword sequences to the keyword pair generator 132.

The keyword pair generator 132, upon receiving keyword sequences of each EPCP, generates a keyword pair list based on the neighboring keywords in the keyword sequences. The keyword pair generator 132 then sends the keyword pair list to the keyword filter 134.

The keyword filter 134, upon receiving the keyword pair list and the KG_kwd, removes unneeded keyword pairs, filters out the keyword pair list that having at least one keyword that does not belong to the KG_kwd. The keyword filter 134 then sends the filtered keyword pair list to the inference model generator 136.

The inference model generator 136, upon receiving the filtered keyword list, generates an inference model for each EPCP. The inference model represents the probability distribution from one node to all its neighboring nodes with the probability being the likeliness of searching one keyword after another from historical data. The inference model can be used by dialogue and query controller 142. The generated inference models may be stored in the storage device 116, and in certain embodiments, may be loaded in the memory 114 during operation of the user dialogue application 140.

The dialog & query controller 142, upon receiving an initial user search sentence via a user interface, drives an interactive search chat session with the user. The dialog & query controller 142 builds a graph query based on the initial user search sentence, query the knowledge graph (KG) using the graph query to obtain KG result, invokes the inference model to generate the top-k keywords based on the KG result and the inference models, and presents the top-k keywords to the user for selection. After the user selecting one of the top-k keywords, the dialogue & query controller 142 updates the graph query using the selected keyword, repeats the querying KG and invoke the top-k keyword generator 144 to generate a new set of top-k keywords again, and presents the new set of top-k keyword to the user. The process continues until the search task is complete.

The top-k keyword generator 144, upon receiving the graph query result against the KG, selects the top-k diversified keywords based on the inference models. The goal here is to select the top-k keywords, such that the combined probabilities among all possible candidate keywords plus the difference among the candidate keywords are maximized.

Figure 4A:
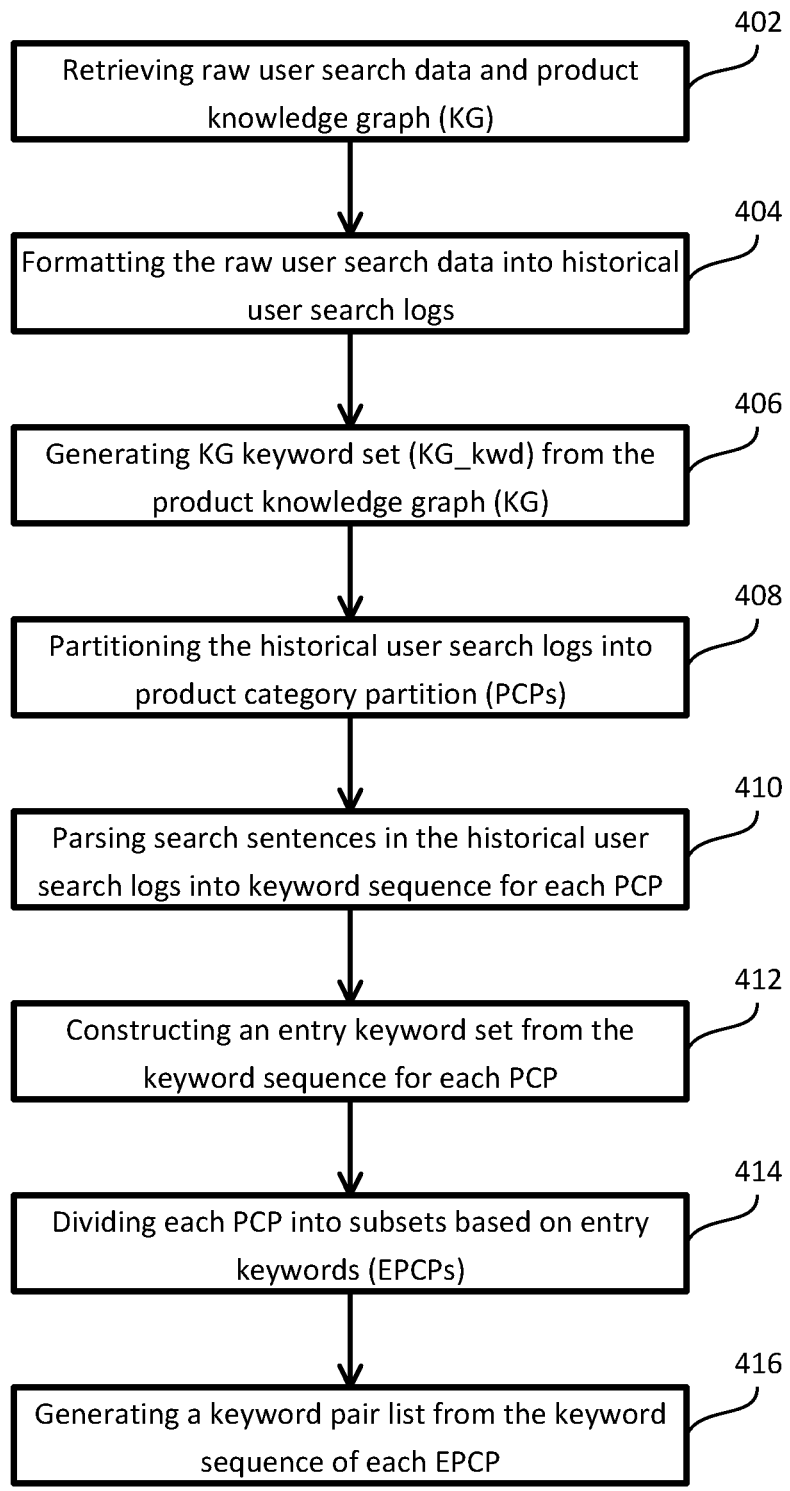
FIG. 4A and FIG. 4B schematically depict a method to build inference models using historical user search data according to certain embodiments of the present disclosure.
Figure 4B:
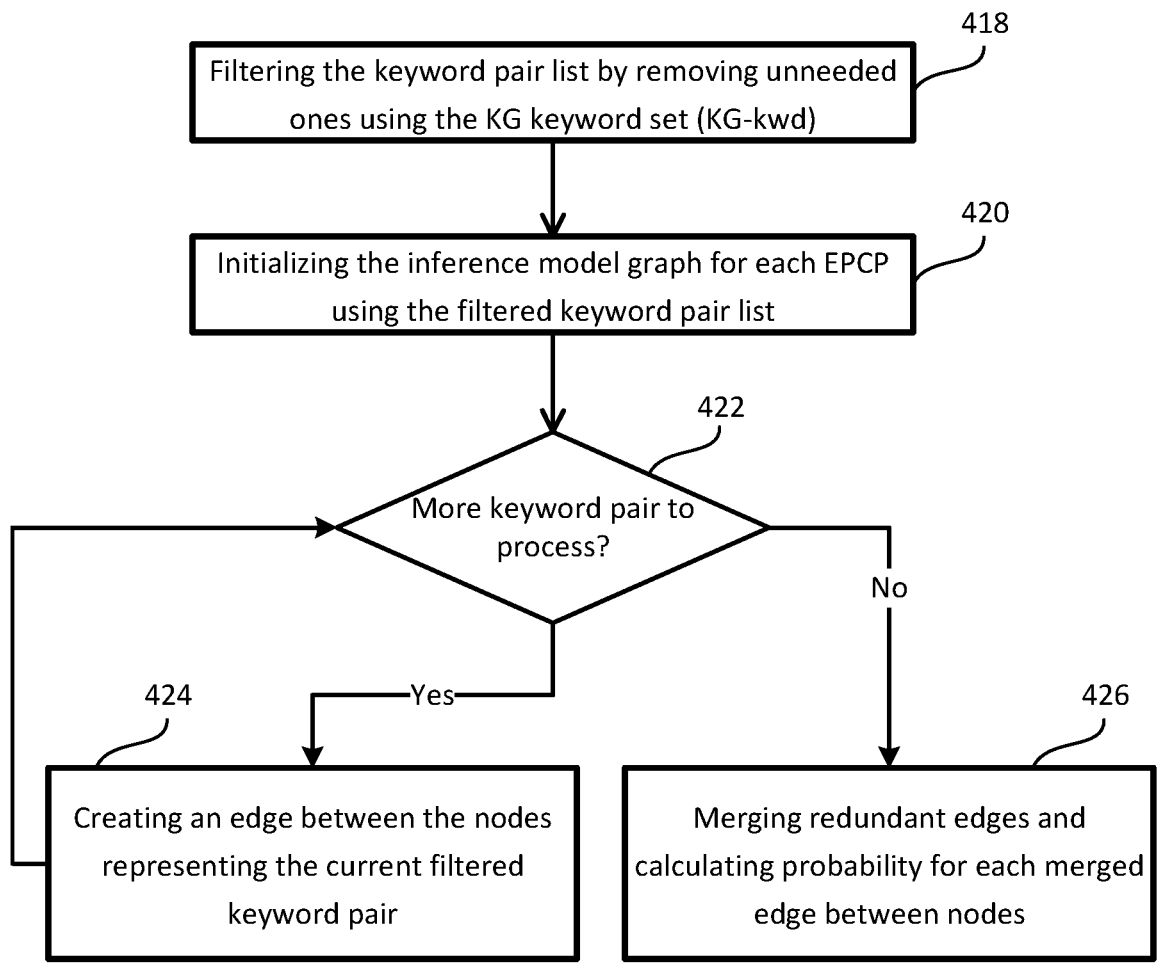

FIG. 4A and FIG. 4B schematically depict a method for generating an inference model according to certain embodiments of the present disclosure. In certain embodiments, the method is implemented by the computing device 110 shown in FIG. 1. In certain embodiments, the method shown in FIG. 4A and FIG. 4B corresponds to the function of the inference model generation application 120. It should be particularly noted that, unless otherwise stated in the present disclosure, the steps of the method may be arranged in a different sequential order, and are thus not limited to the sequential order as shown in FIG. 4A and FIG. 4B.

As shown in FIG. 4A and FIG. 4B, at procedure 402, the external data retriever 122 retrieves or receives raw user search history 160 and the product knowledge graph (KG) 180 from the corresponding external data sources, sends the raw user search history to the search log formatter 124, and sends the product KG to the KG keyword set (KG_kwd) generator 126.

At procedure 404, upon receiving the raw user search history, the search log formatter 124 transforms each raw user search history data entry into a historical user search log. The obtained search logs are stored in a relational table. In certain embodiments, each search log has the following four columns/attributes: search time, search user id, search sentence, and product sku_id. If the raw search entry does not have the product sku_id info available, that entry is discarded.

At procedure 406, upon receiving the product KG, the KG_kwd generator 126 generates the universal keyword set (KG_kwd) from the product KG. This is done by traversing the product knowledge graph and collecting the information from each node. In the KG, each node has a type, name and a set of attributes which are represented by key-value pairs. KG_kwd contains all node types, names, node attribute keys and values. Each keyword is associated with an integer number which indicates how many times it occurs in the KG. In certain embodiments, there is no need for the external data retriever 122 to retrieve the product KG and send the product KG to the KG generator 126. Instead, the product KG is accessible to the KG_kwd generator 126, and the KG_kwd generator 126 performs certain functions to the product KG to obtain the KG_kwd. After obtaining the KG_kwd, the KG_kwd generator 126 sends the KG_kwd to the keyword filter 134.

At procedure 408, upon receiving the search logs from the search log formatter 124, the product category partitioner 128 separates the historical user search logs into different partitions based on their product categories. Search logs belonging to the same product category form a product category partition (PCP). After completing the partition, the product category partitioner 128 sends the PCPs to the search log parser 130.

At procedure 410, upon receiving the PCPs containing the search logs, the search log parser 130 decomposes the search sentence of each search log into a keyword sequence. The first keyword in each keyword sequence is termed the entry keyword of that keyword sequence.

At procedure 412, after decomposing the search sentence into keyword sequences, the search log parser 130 further constructs an entry keyword set by collecting the first keywords or entry keywords from all the keyword sequences of the current PCP it is processing.

At procedure 414, the search log parser 130 then divides each PCP into subsets based on the entry keywords. Each subset is called an entry product category partition (EPCP), which consists of search logs which share the same first keyword (entry keyword). The search log parser 130 processes all the PCPs this way, to obtain EPCPs for each of the PCPs, and sends the EPCPs containing keyword sequences and entry keyword set to the keyword pair generator 132.

At procedure 416, upon receiving the EPCPs containing the keyword sequences, the keyword pair generator 132 generates a keyword pair list for each EPCP. For each keyword sequence in the EPCP, keyword pairs are generated by pairing every keyword and the keyword following it (if it exists). The keyword pair generator 132 adds all generated keyword pairs together to form a keyword pair list, and sends the keyword pair list to the keyword filter 134.

At procedure 418, upon receiving the keyword pair list from the keyword pair generator 132 and the KG_kwd from the KG_kwd generator 122, the keyword filter 134 removes unneeded keyword pairs from the keyword pair list for each EPCP. If at least one keyword from a keyword pair is not present in the KG keyword set KG_kwd, the keyword pair is removed from the keyword pair list. The keyword filter 134 then sends the filtered keyword pair list of each EPCP to the inference model generator 136. In certain embodiments, when the entry keyword is not listed in the KG_kwd, the EPCP is deleted.

At procedure 420, upon receiving the filtered keyword pair list for each EPCP from the keyword filter 134, the inference model generator 136 generates one inference model for each EPCP. Specifically, for each EPCP with the keyword pair list, the inference model generator 136 first initializes the inference model graph by inserting nodes only for each EPCP. Each node corresponds to one keyword in the filtered keyword pairs of the corresponding EPCP. If a keyword exists multiple times in the keyword pair list, only one node is created. A node for the entry keyword is called the entry node.

At procedure 422, the inference model generator 136 checks if there is more filtered keyword pairs to process If more filtered keyword pair exists, the inference model generator 136 retrieves the next filtered keyword pair and invokes procedure 424. Otherwise, procedure 426 is invoked.

At procedure 424, the inference model generator 136 first locates the corresponding two nodes of the keyword pair in the inference model graph. It then inserts a temporary edge from the node of the first keyword to the node of the second keyword.

At procedure 426, when all the filtered keyword pairs in the EPCP are processed, the inference model generator 136 counts the number of all temporary edges directed from a first node to a plurality of second nodes, and calculates the probability value from the first node to one of the second nodes by: dividing the number of temporary edges from the first node to the one of the second nodes by the total number of temporary edges from the first node to all the second nodes.

After or during the calculation of all the probabilities (or probability values) between all nodes in one inference model, the inference model generator 136 merges all temporary edges with the same direction between the same two nodes into one edge and the probability between the two nodes is assigned to this merged edge. By the above procedures, the inference model generator 136 constructs an inference model for each of the EPCPs. As described above, each inference model includes a plurality of nodes representing keywords frequently used by users, and the edge from one of the nodes to the other one of the nodes is associated with a probability value. The probability value represents the probability that a user searches the keyword corresponding to the other one of the nodes after searching the keyword corresponding to the one of the nodes.

Figure 5:
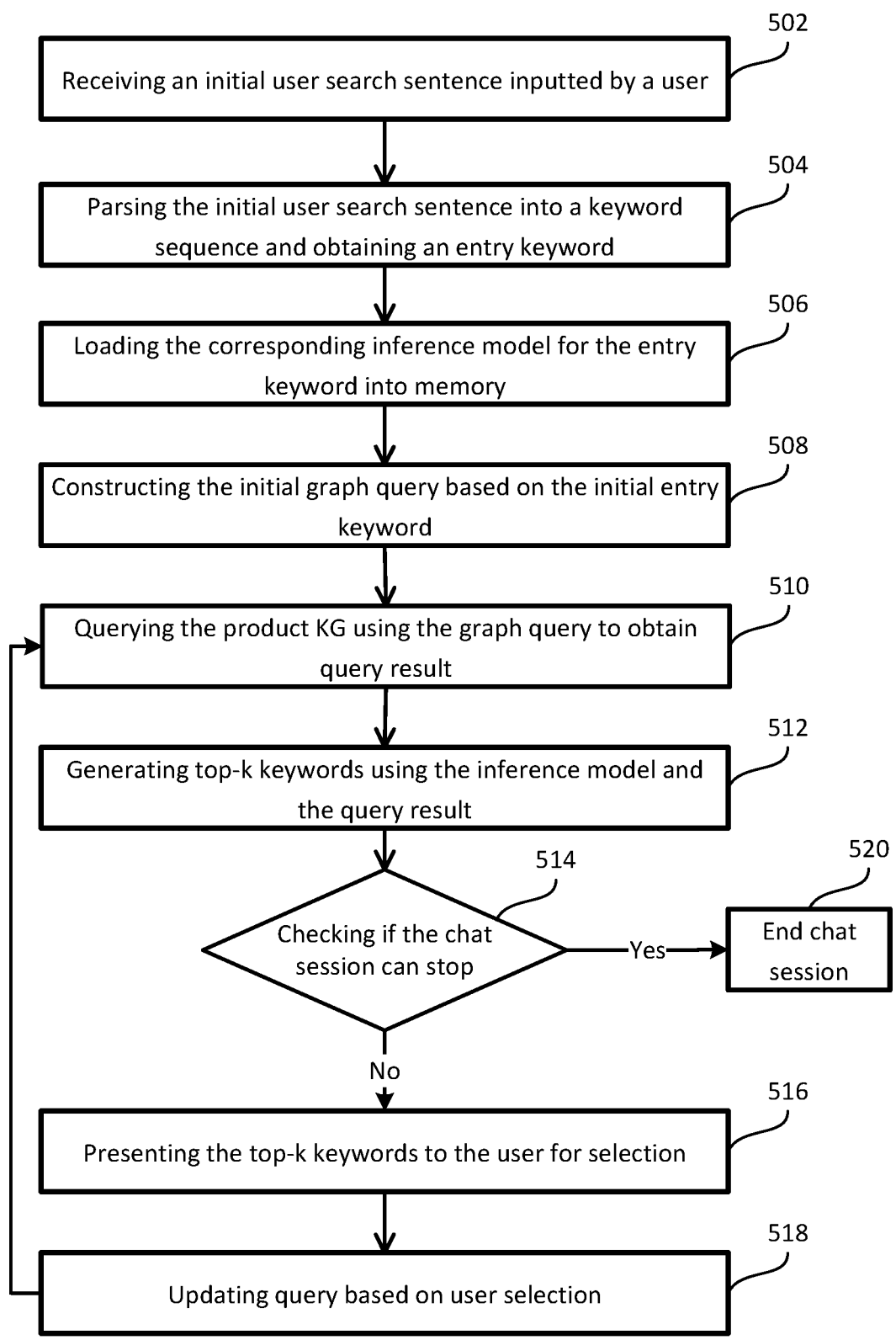
FIG. 5 schematically depicts a method for conducting an interactive user search chat session according to certain embodiments of the present disclosure.

FIG. 5 schematically depicts a method for conducting an interactive user search chat session according to certain embodiments of the present disclosure. In certain embodiments, the method is implemented by the computing device 110 shown in FIG. 1. In certain embodiments, the method shown in FIG. 5 corresponds to the function of the user dialogue application 140. It should be particularly noted that, unless otherwise stated in the present disclosure, the steps of the method may be arranged in a different sequential order, and are thus not limited to the sequential order as shown in FIG. 5.

As shown in FIG. 5, at procedure 502, the dialogue & query controller 142 provides a user interface to a user terminal, such as a general purpose computer, a pad or a smart phone, and receives a user input via the user interface. The user input may be an initial user search sentence.

At procedure 504, after receiving the user search sentence, the dialogue & query controller 142 decomposes the user search sentence into a keyword sequence, and selects the keyword with the highest frequency as the entry keyword. The frequency of the keywords in the keyword sequence is determined by referring to the keyword set KG_kwd accessible to the dialogue & query controller 142. As described in the previous section of the present disclosure, the KG_kwd is generated using the product KG, and contains all node type names, node attribute keys and values in the product KG, and each keyword is associated with an integer number which indicates how many times the keyword occurs in the product KG. The integer number in the KG_kwd is also called the frequency of the keyword. The entry keyword in the keyword sequence of the user search sentence has the greatest integer number when comparing with the integer numbers of other keywords in the keyword sequence.

At procedure 506, after determining the entry keyword of the keyword sequence of the initial user search sentence, the dialogue & query controller 142 retrieves the inference model having the same entry keyword and load the inference model to the memory. At the same time, the product KG is also accessible to the dialogue & query controller 142. For example, the product KG may also be loaded to the memory. In certain embodiments, the inference model may be determined and loaded later when the query against the product KG gives a query result that includes greater than the predetermined number of result entries. In certain embodiments, though the method includes iterative steps, the inference model only need to be loaded once because the iterations uses the same product KG and the same inference model during the iterative process.

At procedure 508, the dialogue & query controller 142 uses the entry keyword to construct a query graph. In certain embodiments, the query graph contains only one node using the entry keyword generated in procedure 504. If this keyword is an attribute key (for example "color"), the dialogue & query controller 142 adds a node with this attribute key (node "Color"). If this keyword is an attribute value (for example "Red"), the dialogue & query controller 142 locates its corresponding key (using KG_kwd) and adds a node with this attribute key-value pair (for example "Color: Red").

At procedure 510, the dialogue & query controller 142 queries the product KG using the graph query to obtain a query result, and sends the query graph (or query result) to the top-k keyword generator 144 when the query result include more than the predetermined number of query result. As described above in detail, when the query result is empty, the dialogue & query controller 142 may delete one keywords from the query graph that is less important or has low frequency, and query the product KG again using the new query graph; the deletion may be repeated until the query result is not empty. When the query result includes less than the predetermined number of result entries, such as 1-5 result entries, the 1-5 result entries are presented to the user. When the query result includes more than the predetermined number of result entries, the dialogue & query controller 142 sends the query graph to the top-k keyword generator 144.

At procedure 512, upon receiving the query graph (when the query result has more than the predetermined number of result entries) from the dialogue & query controller 142, the top-k keyword generator 144 selects top-k diversified keywords from the inference model based on the inference model and the product KG. In certain embodiments, the entry keyword from the keyword sequence has a corresponding node in the inference mode, and that entry keyword node is directed to a plurality of nodes corresponding to a plurality of different keywords. The top-k keyword generator 144 selects the top-k keywords from the plurality of different keywords in the inference model based on different algorithms (in other embodiments, the top-k keyword generator 144 may also select the top-k keywords from all the keywords in the inference model). In certain embodiments, k is a positive integer in a range of 2-10, and the top-k keywords could be, for example, top-3, top-4 or top-5 keywords. In certain embodiments, the top-k keyword generator 144 performs the selection of the top-k keywords by optimizing the object function F(R) described above, which considers the high probability from the entry keyword to the top-k keyword, and the differences between the top-k keyword. In certain embodiments, to optimize the objection function F(R), the top-k keyword generator 144 uses at least one of the exact method, the 2-approximation method, and the Heuristic method. In certain embodiments, the 2-approximation method and the Heuristic method are preferred due to the calculation speed. In certain embodiments, the Heuristic method is used for fast calculation. In certain embodiments, results from the 2-approximation method and the Heuristic method are combined to provide more accurate prediction. In certain embodiments, when the calculation power is sufficient, the exact method is used to provide the highest prediction accuracy. after obtaining the top-k keywords, the top-k keyword generator 144 sends the top-l keywords to the dialogue & query controller 142.

At procedure 514, upon receiving the top-k keywords, the dialogue & query controller 142 determines whether the chat session can be ended or not. The standard for ending the char session may include whether the user is satisfied with the search result or whether there are sufficient top-k keywords available. For example, if the user is satisfied with the search result and does not select or click the top-key keywords presented to him/her, or the user ended the chat session, the process is ended. If in the last round of search using the query graph, the query result includes less than a predetermined result entries, those result entries are presented to the user and no further suggestion of top-k keywords are needed. But if the last round of query results in a large number of result entries, the top-key keywords would be generated and at procedure 516, the dialogue & query controller 142 presents the top-k keyword to the user through the user interface.

At procedure 518, the user selects one of the presented top-k keyword, the selection is received by the dialogue & query controller 142, and the dialogue & query controller 142 add the selected keyword to the initial graph query. The updated query now includes the entry keyword and the selected keyword, and the edge from the entry keyword to the selected keyword.

With the updated graph query available, the dialogue & query controller 142 repeats the above process from procedures 510. In certain embodiments, the dialogue & query controller 142 uses the updated graph query to query the product KG to obtain the query result, and when the query result includes more than the predetermined number of results, sends the updated graph query to the top-k keyword generator 144 to generate a new set of top-k keywords, and presents the generated top-k keywords to the user for selection. In certain embodiments, when presenting the top-k keywords to the user, the dialogue & query controller 142 also presents a number of top query results, such as 3-5 top query result to the user, and when the user is satisfied with one of the result, he/she does not need to select one of the top-k keywords and thus can end the process.

At procedure 514, when there is no sufficient top-k keywords, the dialogue & query controller 142 ends the chat session at procedure 520 because the whole process have already used most of the information available in the inference model. In certain embodiments, the chat session is ended by the user when the user is satisfied with the search result. In certain embodiments, as described above, the procedure ends when the number of result entries is less than the predetermined number.

Figure 6:
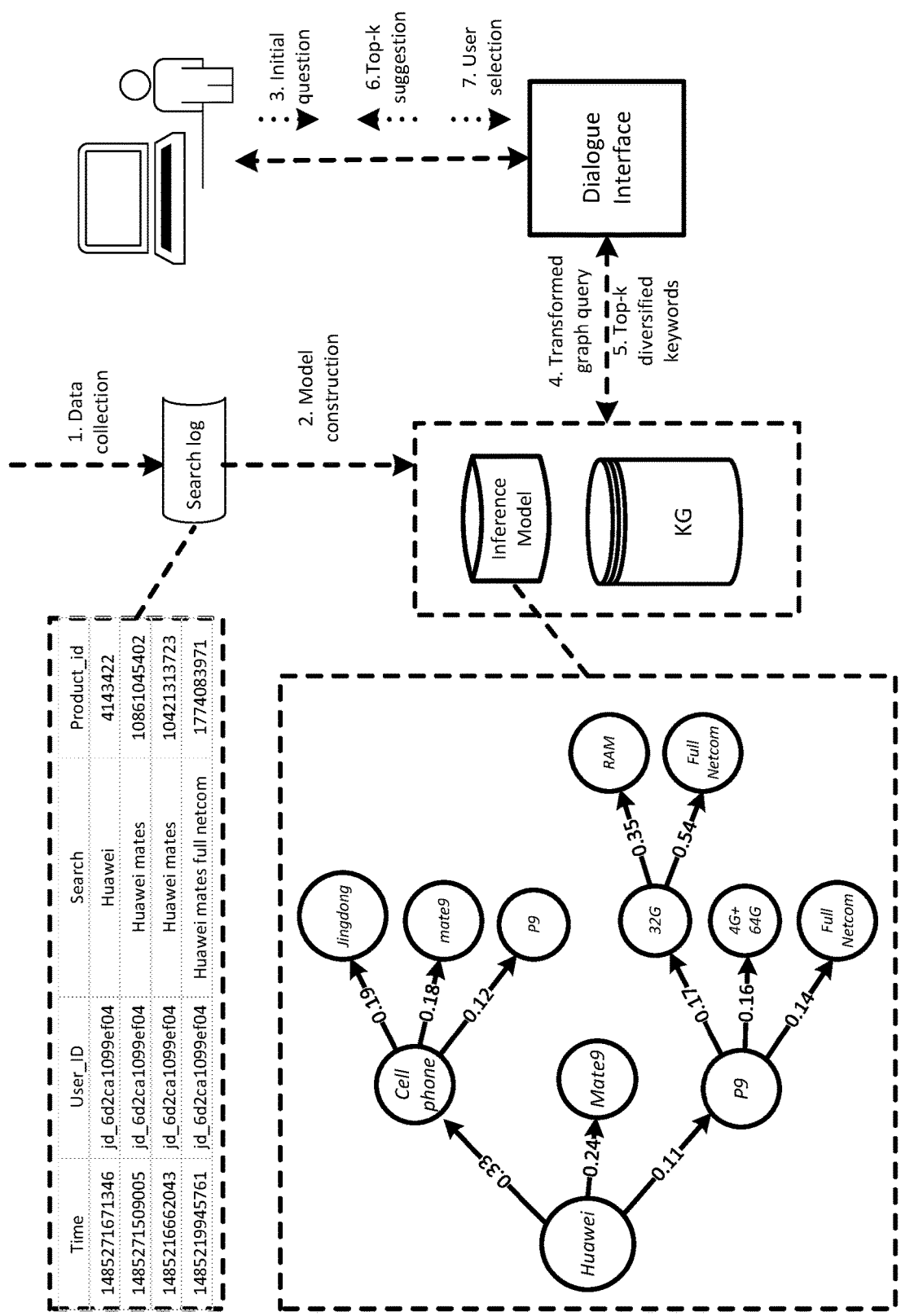
FIG. 6 shows a prompt based dialogue system according to certain embodiments of the present disclosure.

FIG. 6 shows a prompt based dialogue system according to certain embodiments of the present disclosure. In certain embodiments, the system is implemented as the system 100 shown in FIG. 1. This dialogue system is efficient to provide answers for vague questions, where a vague question means that a user gives an initial but simple questions and requires guidance to help him find the answer, and the system may provide a set of products for the user to select from. As shown in FIG. 6, the prompt based dialogue system, at the first step, collects search data of difference customers in an e-commerce platform. The search data may be the historical search data in a predetermined time, such as last year. In the second step, the system construct inference models. After construction, those inference models may be updated regularly based on newly collected data. When a user want to ask a question on the e-commerce platform at step 3, he enters a question (query) from his terminal through a dialogue interface provided by the system. The question may be a natural language sentence. After receiving the question, the system transforms the question at step 4 into a graph query, and query the KG using the graph query. When the KG provides an exact match or less than a pre-determined number of results (such as 1-5), the query result is presented to the user. When the query result from the product KG is empty, the system may stop the process or delete a keyword from the query graph and conduct a new query against the product KG. When the query result from the product KG includes a large number of result entries, the system uses the inference model and the product KG to select candidate keywords. After receiving the question or after receiving the query graph, the keyword in the query graph (or in the question) that has the highest keyword frequency is used as entry keywords to load a corresponding inference model. The inference model, based on the query results by adding candidate keywords in the inference model to the query graph, provides top-k diversified keywords to the dialogue interface at step 5 (based on object function values of the query graphs with different added candidate keywords), and the dialogue interface presents the top-k suggestions to the user at step 6. At step 7, the user chooses one of the top-k suggestions. After that, the selection is feedback to the system, and the initial graph query is updated by adding the selected keyword into the graph query. The graph query is used to search the KG, the result from the KG is inputted to the inference model, the inference model provides another set of top-k diversified keywords, and the top-k diversified keywords are then presented to the user for selection. The process is repeated until the user find a satisfied answer, or the inference model cannot provide sufficient number of top-k keywords.

Figure 7:
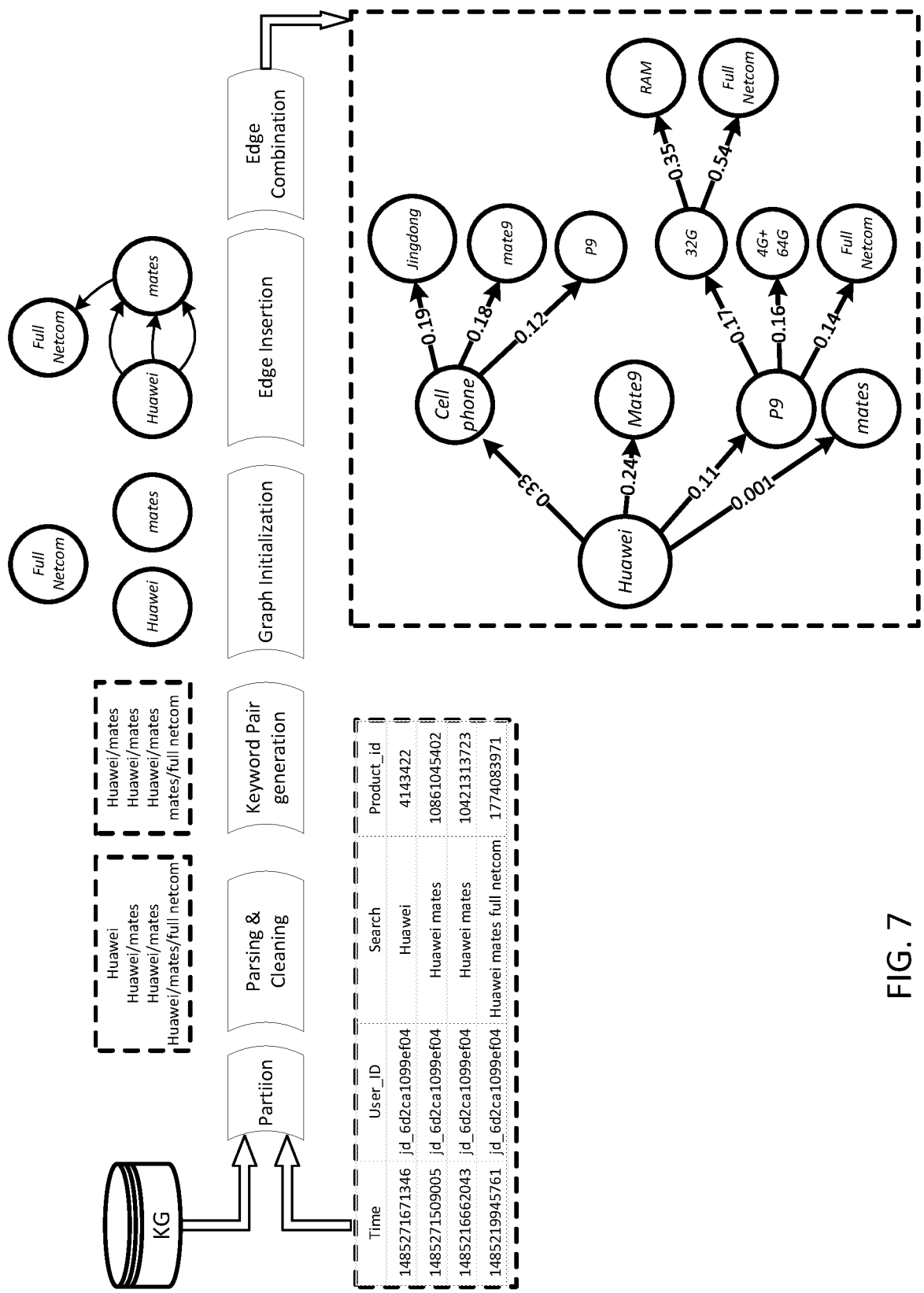
FIG. 7 schematically depicts construction of an inference model according to certain embodiments of the present disclosure.

FIG. 7 schematically depicts construction of an inference model according to certain embodiments of the present disclosure. In certain embodiments, the construction of the inference model is implemented by the computing device 110 shown in FIG. 1. In certain embodiments, the inference model is defined as a directed graph $G_1(V_1, E_1)$. Each $v_1 \in V_1$ represents a keyword, and each $e_1 \in E_1(v_1 \to v_2)$ represents the probability of searching $v_2$ after searching $v_1$. Specifically, as shown in FIG. 7, after cleaning of the search history of customers from an e-commerce platform, the search log includes a large number of search entries. Each entry has a time stamp, a user ID, a search text/sentence, and product ID. In certain embodiments, the search entry may only include the search sentence and the product ID for simplicity. Based on the product category from the KG, the search logs are partitioned to PCPs based on the product category. The system then uses the parser to parse the search sentence of each entry and optionally remove certain unimportant words, to obtain a keyword sequence. The first keyword in each keyword sequence is termed the entry keyword. The system further partition each PCP into multiple EPCPc based on the entry keyword, where each EPCP includes the keyword sequences that have the same entry keyword. The system then constructs one inference model for each EPCP. For each EPCP, the system generate a keyword pair list. The keyword pairs are generated from the keyword sequence by selecting every keyword and the keyword next to it (if exists). The keyword pairs are filtered using the KG_kwd, where if a keyword pair has one keyword that doesn't belong to the KG_kwd, that keyword pair is discarded. After generating the keyword pair list and filtering the keyword pairs, the obtained filtered keyword pairs are used to build the inference model. The system first initialize the graph by defining the keywords in the keyword pairs as nodes. If two keywords are the same, there is only one node defined corresponding to the repeating keywords. For each keyword pair, a temporary edges is inserted from the node corresponding to the first keyword in the keyword pair to the node corresponding to the second keyword in the keyword pair. If two keyword pairs are the same, two temporary edges are added. After drawing all the nodes and temporary edges, a probability value is calculated based on the number of temporary edges. Specifically, for a node m to all its directed nodes $n_1, n_2, n_3 \ldots, n_k$, the probability value of the edge from node m to node $n_k$ is calculated as: the number of temporary edges from node m to node $n_k$ divided by the total number of temporary edges from node m to node $n_1$, from node m to node $n_2$, from node m to node $n_3, \ldots$, from node m to node $n_k$. The bottom right of FIG. 7 is a part of an inference model, where some nodes and edges are deleted, so that the figure is more readable to a reader.

In summary, certain embodiments of the present disclosure provides a framework for building an inference model from historical user search data on an ecommerce website. Further, a dialog component is provided to guide users to find what they are looking for quickly utilizing the inference models.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system comprising a computing device, the computing device comprising a processor and a storage device storing computer executable code, wherein the computer executable code, when executed at the processor, is configured to:

provide a plurality of inference models based on user search data, wherein each of the inference models comprises nodes and edges between the nodes, each of the edges pointing from a first node to a second node is characterized with a probability value, and the probability value represents a probability of searching a second keyword corresponding to the second node after searching a first keyword corresponding to the first node, obtain one of the inference models that has a determined entry keyword as entry keyword;

obtain a plurality of top candidate keywords from the one of the inference models based on the probability values between the entry keyword and keywords linked to the entry keyword in the one of the inference models; and provide the top candidate keywords to a user such that the user can select one of the top candidate keywords for further querying.

2. The system of claim 1, the computer executable code is configured to provide the inference models by:

retrieving the user search data, the user search data comprising a plurality of search entries, each of the search entries corresponding to a product and comprising a search sentence;

dividing the search entries into product category partitions (PCPs) based on the corresponding products of the search entries, such that the corresponding products of the search entries in the same PCP belonging to a same category;

parsing each of the search entries into a keyword sequence and define a first keyword in the keyword sequence as the entry keyword;

partitioning each of the PCPs into entry keyword PCPs (EPCPs) based on the entry keywords of the search entries, such that the search entries in a same EPCP have a same entry keyword; and for each of the EPCPs:
generating a keyword pair list from the keyword sequences of the search entries in the EPCP, wherein each keyword pair in the keyword pair list comprises two sequentially neighboring keywords from a same one of the keyword sequences; and constructing the inference model of the EPCP using the keyword pair list, wherein nodes of the inference model are keywords from the keyword pair list, an edge from one of the nodes directing to another one of the nodes is characterized with a probability value, the one of the nodes corresponds to one keyword, the another one of the nodes corresponds to another keyword, and the probability value is calculated by dividing a number of keyword pairs having the one keyword and the another keyword by a number of keyword pairs having the one keyword.

3. The system of claim 2, wherein the step of parsing each of the search entries into a keyword sequence comprises: comparing words in each of the search entries with a keyword set in a product knowledge graph, and keeping the words matching the keyword set as the keywords in the keyword sequence.

4. The system of claim 1, wherein the computer executable code is further configured to:
provide a product knowledge graph (KG), the product KG comprising product, product category, supplier, place of production, brand and vendor of products;
receive a query entry from the user;
parse the query entry to obtain query keywords and determine the entry keyword from the query keywords;
build a graph query using the query keywords; and
execute the graph query against the product KG to obtain a query result.

5. The system of claim 4, wherein the computer executable code is configured to obtain the top candidate keywords by maximizing the following objective function:

$$F(R) = \sum_{w \in R} p(w', w) + \frac{1}{|R|-1} \sum_{w1 \neq w2 \in R} \mathit{diff}(w1, w2), \text{ and}$$

$$\mathit{diff}(w1, w2) = 1 - \frac{Q_{w1}(KG) \cap Q_{w2}(KG)}{Q_{w1}(KG) \cup Q_{w2}(KG)},$$

wherein R is a top candidate keyword set, w' is a current keyword, w represents each keyword in R, p(w',w) represents a probability value from the keyword w' to the keyword w, |R| is a number of keywords in R, w1 and w2 are two keywords in R, $Q_{w1}$ is a graph query obtained by adding the keyword w1 to a current graph query, $Q_{w1}$ (KG) is an answer of querying a product knowledge graph using the graph query $Q_{w1}$, $Q_{w2}$ is a graph query obtained by adding the keyword w2 to the current graph query, and $Q_{w2}$ (KG) is an answer of querying the product knowledge graph using the graph query $Q_{w2}$.

6. The system of claim 5, wherein the top candidate keyword set R comprises 3 to 5 candidate keywords.

7. The system of claim 5, wherein the computer executable code is configured to obtain the top candidate keywords by:

obtaining a plurality of keywords, wherein an edge is directed from the current keyword w' to each of the obtained keywords in the inference model;
selecting a predetermined number of keywords from the obtained keywords to form one of the candidate keyword sets R;
calculating one of the objective functions F(R) for each candidate keyword set R; and
determining one of the candidate keyword sets R having a greatest value as the candidate keyword set, and keywords in that candidate keyword set are the top candidate keyword.

8. The system of claim 5, wherein the computer executable code is configured to obtain the top candidate keywords by:
obtaining a plurality of keywords, wherein an edge is directed from the current keyword w' to each of the obtained keywords in the inference model;
calculating a pair-wise function for any two keywords in the obtained keywords;
ranking the pair-wise functions based on their values to obtain a pair-wise function rank; and
selecting top candidate keywords corresponding to pair-wise functions on top of the pair-wise function rank,
wherein the pair-wise function for any two keywords w1 and w2 in the obtained keywords is calculated by:

$$f(w1,w2)=p(w',w1)+p(w',w2)+\mathit{diff}(w1,w2).$$

9. The system of claim 8, wherein when the top candidate keywords comprises five keywords, the computer executable code is configured to obtain the five top candidate keywords by:
defining two keywords corresponding to a first pair-wise function as a first and a second top candidate keywords, wherein the first pair-wise function is ranked the highest in the pair-wise function rank;
defining two keywords corresponding to a second pair-wise function as a third and a fourth top candidate keywords, wherein the third and fourth keywords are different from the first and second keywords, and the second pair-wise function is ranked the highest in the pair-wise function rank after the first pair-wise function; and
defining one of two keywords corresponding to a third pair-wise function as a fifth top candidate keyword, wherein the two keywords corresponding to the third pair-wise function are different from the first, second, third, and fourth keywords, and the third pair-wise function is ranked the highest in the pair-wise function rank after the second pair-wise function.

10. The system of claim 5, wherein the computer executable code is configured to obtain the top candidate keywords by:
selecting a first keyword from the obtained keywords, wherein the current keyword w' has a highest probability value to the first keyword;
selecting a second keyword from the obtained keywords, wherein the second keyword, when combined with the first keyword, has an objective function value greater than an objective function value of any other one of the obtained keywords and the first keyword; and
selecting a subsequent keyword from the obtained keywords until a predetermined number of keywords are selected to form the top candidate keywords, wherein the subsequent keyword has a greatest objective function to previous selected keywords.

11. A method for constructing an inference model, comprising:
providing, by a computing device, a plurality of inference models based on user search data,
wherein each of the inference models comprises nodes and edges between the nodes, each of the edges pointing from a first node to a second node is characterized with a probability value, and the probability value represents a probability of searching a second keyword corresponding to the second node after searching a first keyword corresponding to the first node,
obtaining one of the inference models that has a determined entry keyword as entry keyword;
obtaining a plurality of top candidate keywords from the one of the inference models based on the probability values between the entry keyword and keywords linked to the entry keyword in the one of the inference models; and
providing the top candidate keywords to a user such that the user can select one of the top candidate keywords for further querying.

12. The method of claim 11, wherein the inference models are provided by:
retrieving the user search data, the user search data comprising a plurality of search entries, each of the search entries corresponding to a product and comprising a search sentence;
dividing the search entries into product category partitions (PCPs) based on the corresponding products of the search entries, such that the corresponding products of the search entries in the same PCP belonging to a same category;
parsing each of the search entries into a keyword sequence and define a first keyword in the keyword sequence as the entry keyword;
partitioning each of the PCPs into entry keyword PCPs (EPCPs) based on the entry keywords of the search entries, such that the search entries in a same EPCP have a same entry keyword; and
for each of the EPCPs:
generating a keyword pair list from the keyword sequences of the search entries in the EPCP, wherein each keyword pair in the keyword pair list comprises two sequentially neighboring keywords from a same one of the keyword sequences; and
constructing the inference model of the EPCP using the keyword pair list,
wherein nodes of the inference model are keywords from the keyword pair list, an edge from one of the nodes directing to another one of the nodes is characterized with a probability value, the one of the nodes corresponds to one keyword, the another one of the nodes corresponds to another keyword, and the probability value is calculated by dividing a number of keyword pairs having the one keyword and the another keyword by a number of keyword pairs having the one keyword.

13. The method of claim 12, wherein the step of parsing each of the search entries into a keyword sequence comprises: comparing words in each of the search entries with a keyword set in a product knowledge graph, and keeping the words matching the keyword set as the keywords in the keyword sequence.

14. The method of claim 11, further comprising:
providing a product knowledge graph (KG), the product KG comprising product, product category, supplier, place of production, brand and vendor of products;
receiving a query entry from the user;
parsing the query entry to obtain query keywords and determining the entry keyword from the query keywords;
building a graph query using the entry keyword; and
executing the graph query against the product KG to obtain a query result.

15. The method of claim 14, wherein the step of obtaining the top candidate keywords is performed by maximizing the following objective function:

$$F(R) = \sum_{w \in R} p(w', w) + \frac{1}{|R|-1} \sum_{w1 \neq w2 \in R} \mathit{diff}(w1, w2), \text{ and}$$

$$\mathit{diff}(w1, w2) = 1 - \frac{Q_{w1}(KG) \cap Q_{w2}(KG)}{Q_{w1}(KG) \cup Q_{w2}(KG)},$$

wherein R is a top candidate keyword set, w' is a current keyword, w represents each keyword in R, p(w', w) represents a probability value from the keyword w' to the keyword w, |R| is a number of keywords in R, w1 and w2 are two keywords in R, $Q_{w1}$ is a graph query obtained by adding the keyword w1 to a current graph query, $Q_{w1}$ (KG) is an answer of querying a product knowledge graph using the graph query $Q_{w1}$, $Q_{w2}$ is a graph query obtained by adding the keyword w2 to the current graph query, and $Q_{w2}$ (KG) is an answer of querying the product knowledge graph using the graph query $Q_{w2}$.

16. The method of claim 15, wherein the top candidate keyword set R comprises 3 to 5 candidate keywords.

17. The method of claim 15, wherein the step of obtaining the top candidate keywords is performed by:
obtaining a plurality of keywords, wherein an edge is directed from the current keyword w' to each of the obtained keywords in the inference model;
selecting a predetermined number of keywords from the obtained keywords to form one of the candidate keyword sets R;
calculating one of the objective functions F(R) for each candidate keyword set R; and
determining one of the candidate keyword sets R having a greatest value as the candidate keyword set, and keywords in that candidate keyword set are the top candidate keyword.

18. The method of claim 15, wherein the step of obtaining the top candidate keywords is performed by:
obtaining a plurality of keywords, wherein an edge is directed from the current keyword w' to each of the obtained keywords in the inference model;
calculating a pair-wise function for any two keywords in the obtained keywords;
ranking the pair-wise functions based on their values to obtain a pair-wise function rank; and
selecting top candidate keywords corresponding to pair-wise functions on top of the pair-wise function rank,
wherein the pair-wise function for any two keywords w1 and w2 in the obtained keywords is calculated by:

$$f(w1,w2)=p(w',w1)+p(w',w2)+\mathit{diff}(w1,w2).$$

19. The method of claim 15, wherein the step of obtaining the top candidate keywords is performed by:
selecting a first keyword from the obtained keywords, wherein the current keyword w' has a highest probability value to the first keyword;

selecting a second keyword from the obtained keywords, wherein the second keyword, when combined with the first keyword, has an objective function value greater than an objective function value of any other one keyword and the first keyword; and selecting a subsequent keyword from the obtained keywords until a predetermined number of keywords are selected to form the top candidate keywords, wherein the subsequent keyword has a greatest objective function to previous selected keywords.

20. A non-transitory computer readable medium storing computer executable code, wherein the computer executable code, when executed at a processor of a computing device, is configured to:

provide a plurality of inference models based on user search data, wherein each of the inference models comprises nodes and edges between the nodes, each of the edges pointing from a first node to a second node is characterized with a probability value, and the probability value represents a probability of searching a second keyword corresponding to the second node after searching a first keyword corresponding to the first node;

obtain one of the inference models that has a determined entry keyword as entry keyword;

obtain a plurality of top candidate keywords from the one of the inference models based on the probability values between the entry keyword and keywords linked to the entry keyword in the one of the inference models; and provide the top candidate keywords to a user such that the user can select one of the top candidate keywords for further querying.

* * * * *